March 6, 1962    R. E. BOYDEN ETAL    3,023,953
CALCULATING MACHINE CLUTCH CONTROL MEANS
Original Filed Oct. 25, 1956    12 Sheets-Sheet 1

INVENTORS,
Robert E. Boyden,
Milton V. Scozzafava
& Alpheus F. Stansell
BY
ATTORNEY.

March 6, 1962   R. E. BOYDEN ETAL   3,023,953
CALCULATING MACHINE CLUTCH CONTROL MEANS
Original Filed Oct. 25, 1956   12 Sheets-Sheet 5

INVENTORS,
Robert E. Boyden,
Milton V. Scozzafava
& Alpheus F. Stansell
BY
ATTORNEY.

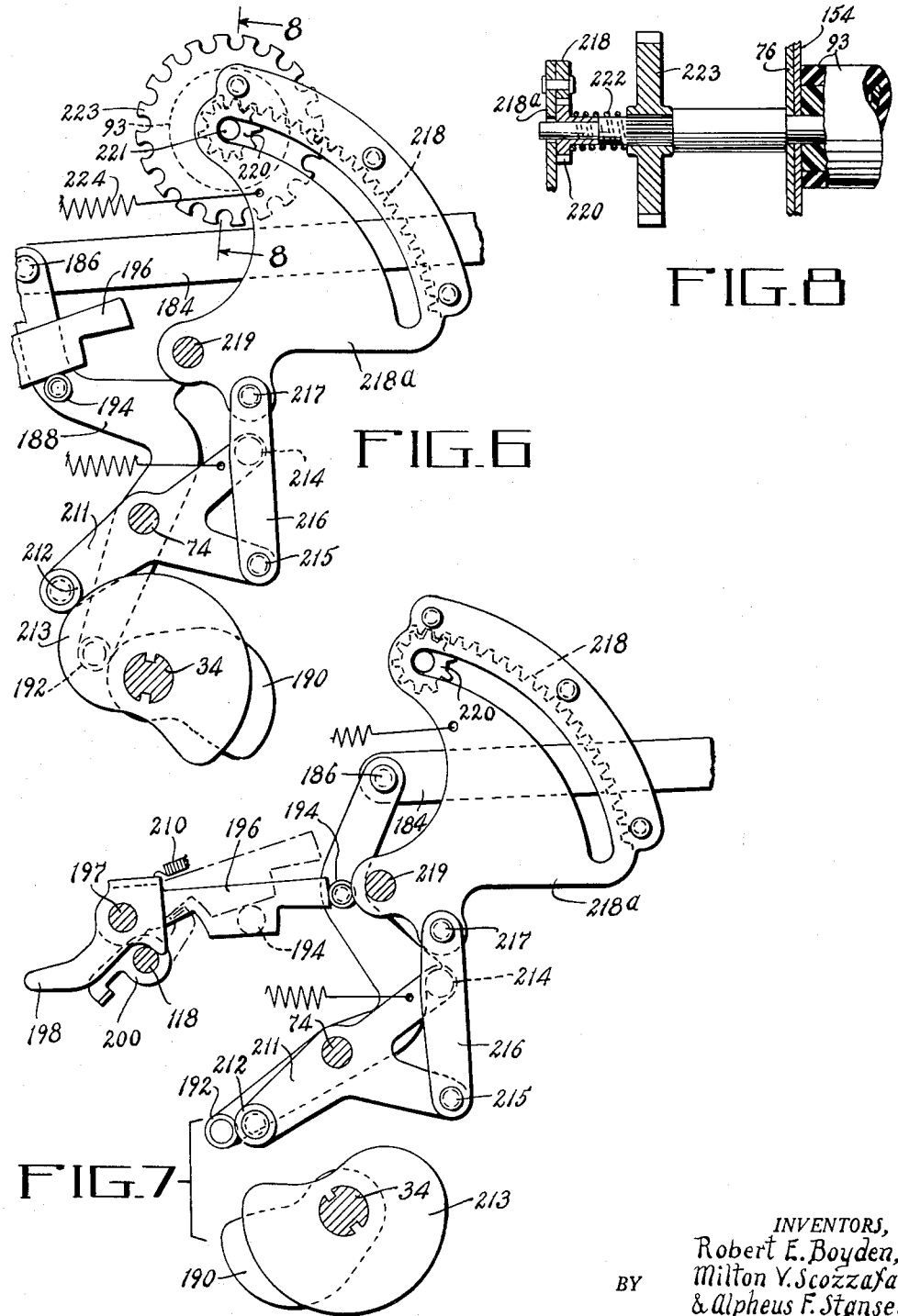

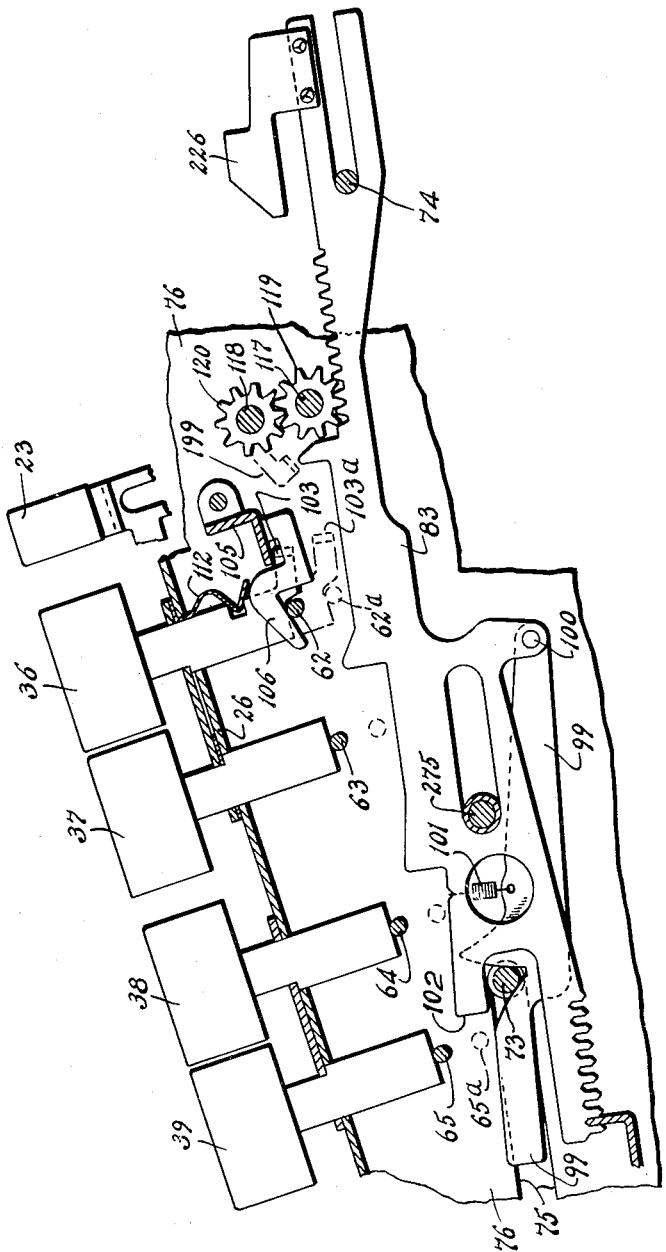

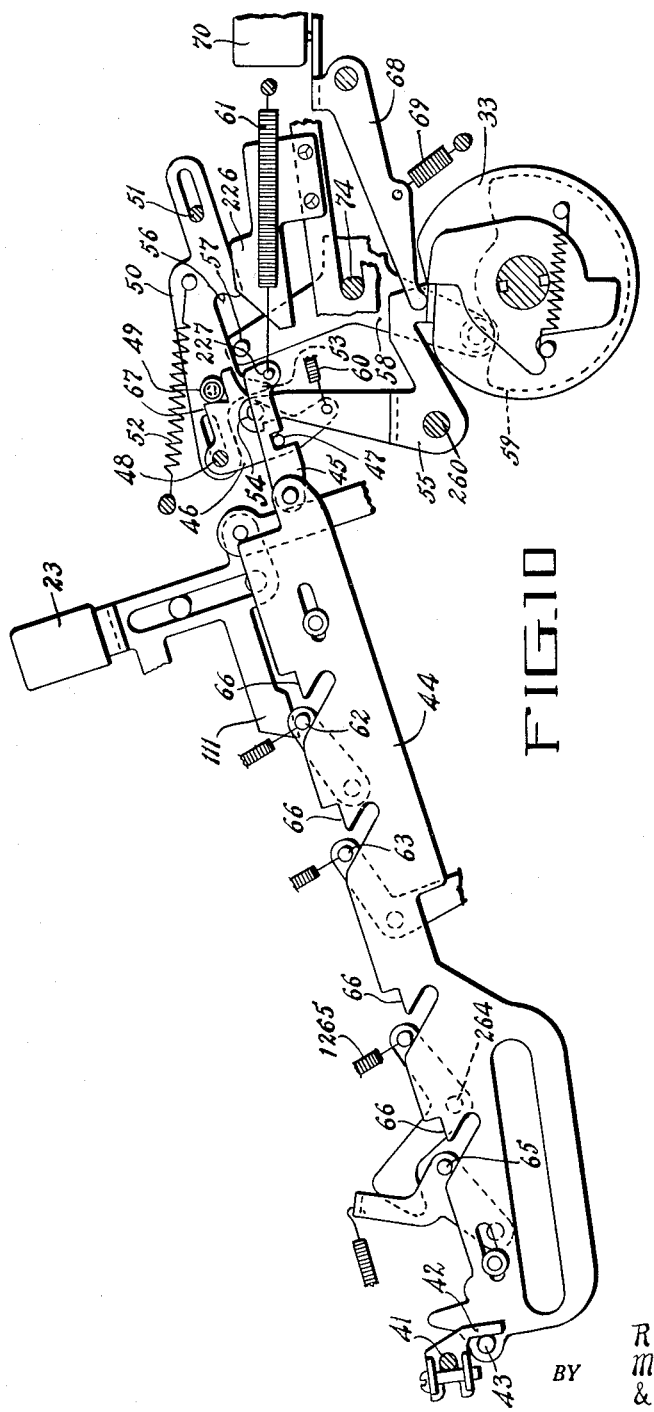

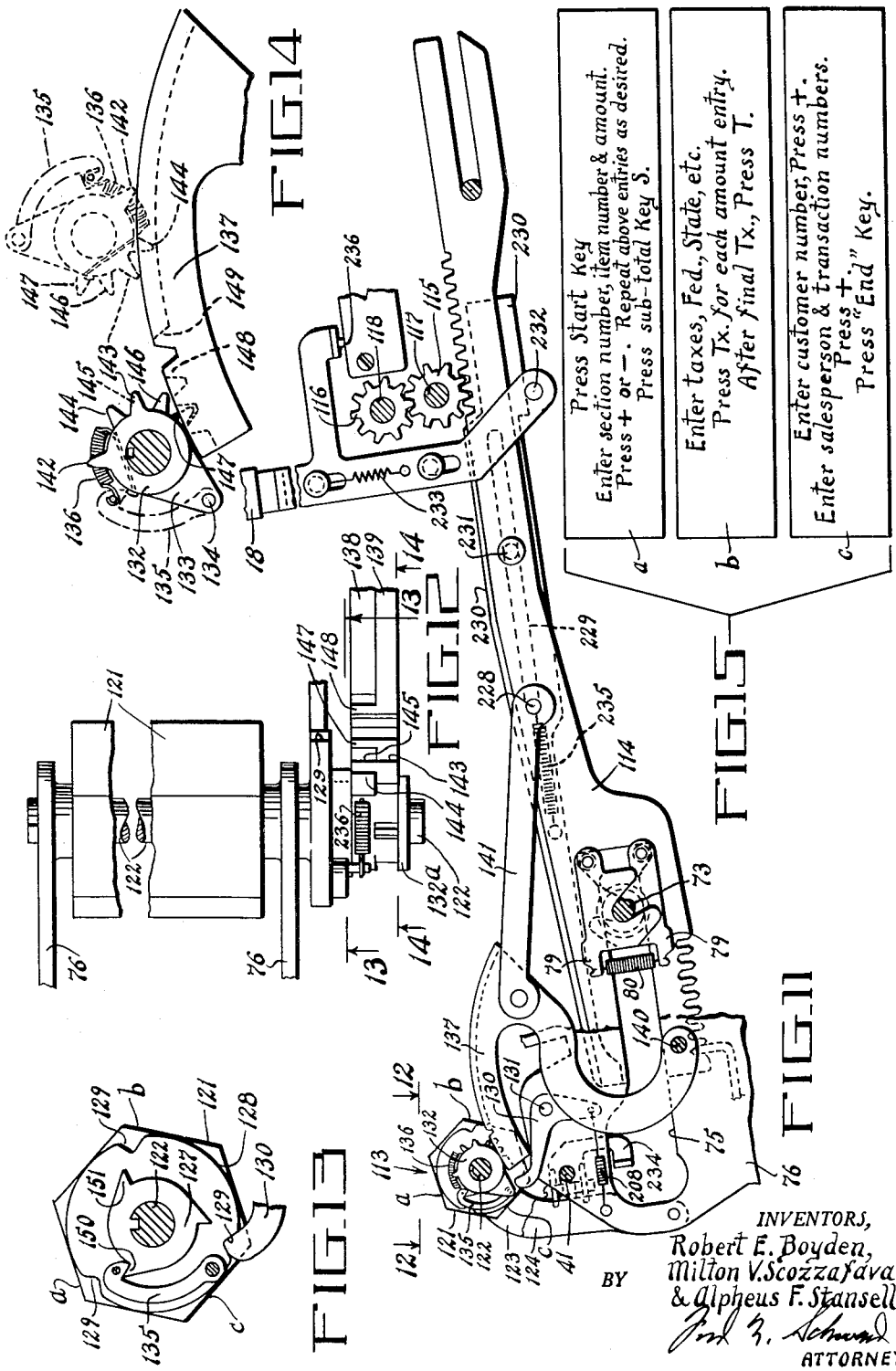

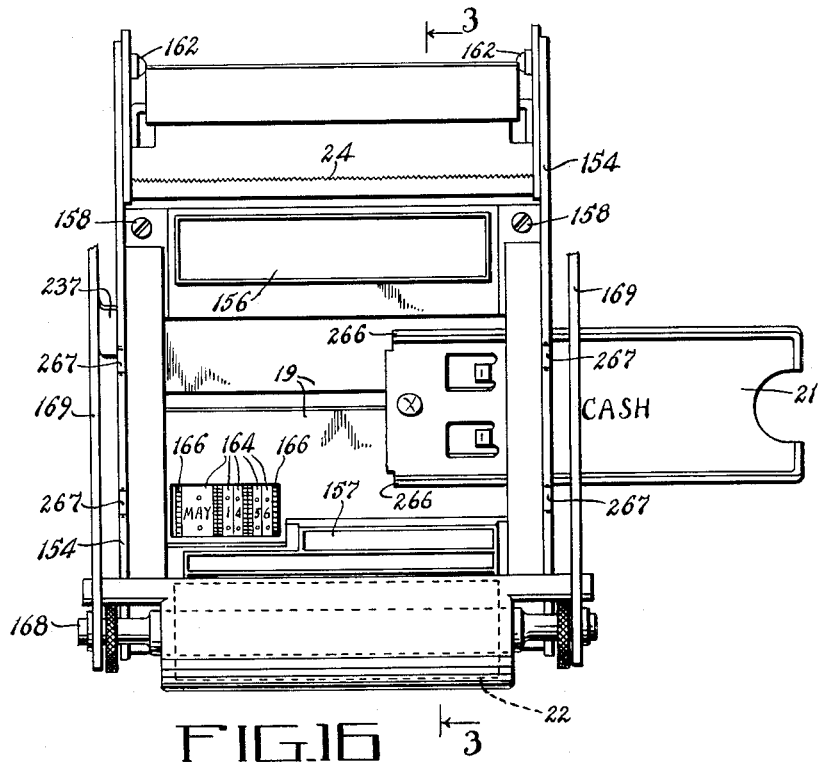
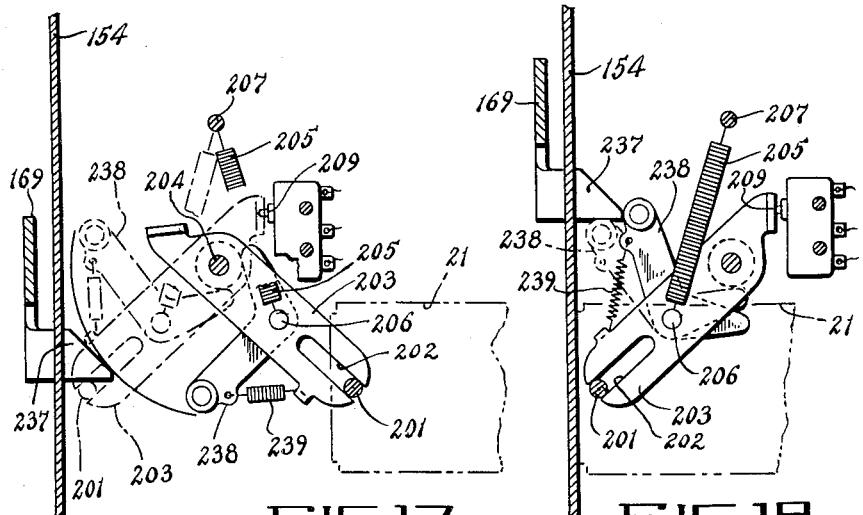

March 6, 1962  R. E. BOYDEN ETAL  3,023,953
CALCULATING MACHINE CLUTCH CONTROL MEANS
Original Filed Oct. 25, 1956    12 Sheets-Sheet 11

INVENTORS,
Robert E. Boyden,
BY  Milton V. Scozzafava
& Alpheus F. Stansell

ATTORNEY.

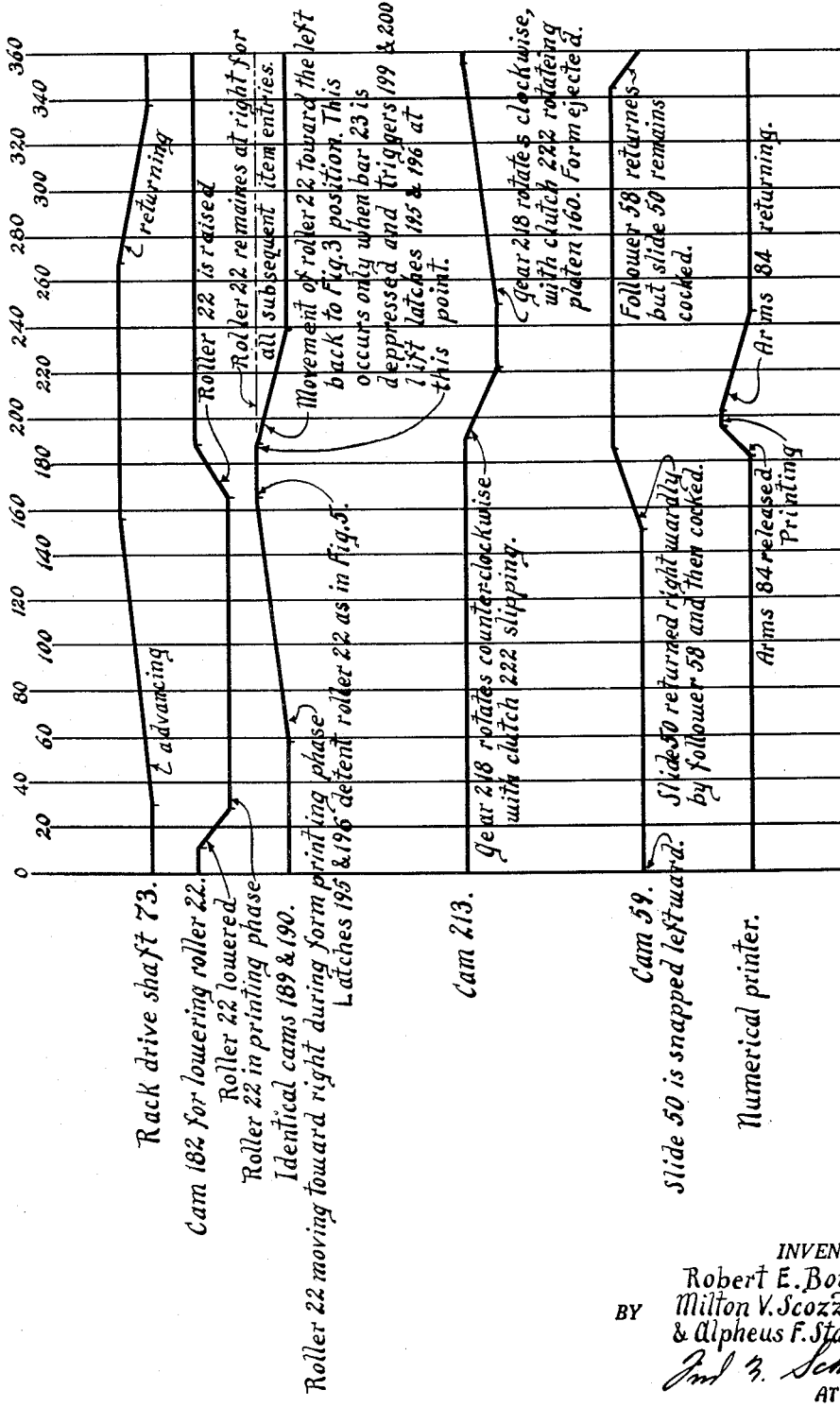

United States Patent Office 3,023,953
Patented Mar. 6, 1962

3,023,953
CALCULATING MACHINE CLUTCH CONTROL MEANS
Robert E. Boyden, San Gabriel, Milton V. Scozzafava, Arcadia, and Alpheus F. Stansell, San Lorenzo, Calif., assignors to Clary Corporation, San Gabriel, Calif., a corporation of California
Original application Oct. 25, 1956, Ser. No. 618,345, now Patent No. 2,894,449, dated July 14, 1959. Divided and this application May 11, 1959, Ser. No. 817,019
9 Claims. (Cl. 235—62)

This invention relates to business machines for aiding and recording sales transactions and has particular reference to a receipt printer therefor.

Heretofore, department stores and the like have generally utilized cash registers for keeping a record of the amount of money involved in sales transactions. The clerk identification number, department number and other identification matter was also entered into the cash register and recorded on a printed record. The sales person also generally recorded in more detail data pertaining to each sale, such as the class of merchandise, the number of items sold, department number, etc., in a separate sales book or sales record.

A receipt was printed by the cash register and given to the customer. Later, the cash register and the sales book entries were forwarded to an accounting department where the records were correlated and were processed to compile statistics for inventory control, taxes, and the like. Also, statements were prepared from the sales book entries in the case of charge transactions.

The above procedure, although generally satisfactory, required considerable duplication of work in entering data in the cash register and also in the sales book entries. Also, the correlation of the various records and additional handling of the same by the accounting department further increased the amount of clerical work.

It, therefore, becomes a principal object of the present invention to provide an improved apparatus for concomitantly providing a customer's receipt and a complete record of the sales transaction.

Another object is to reduce the duplication of work on the part of a sales person and/or cashier in recording a sales transaction.

Another object is to reduce the amount of manual figuring and book work in making a sales transaction.

Another object is to reduce the average time necessary for sales personnel and customers in making sales transactions.

Another object is to reduce errors in accounting procedures incident to sales transactions.

The following specification and the accompanying drawings will reveal the manner in which the above and other objects are accomplished.

FIG. 1 of the drawings is a plan view of a sales transaction machine embodying the present invention.

FIG. 6 is a sectional elevation of a paper feed mechanism in its initial position and is taken along the line 6—6 of FIG. 1.

FIG. 7 is a view similar to FIG. 6 showing the paper feed in its advanced position part way through the machine cycle.

FIG. 8 is a transverse sectional view taken along the line 8—8 of FIG. 6.

FIG. 9 is a longitudinal sectional elevation of the main symbol rack and its control bars.

FIG. 10 is a sectional elevation of the clutch and its controls.

FIG. 11 is a sectional view of the auxiliary symbol rack and its driving connection to the program drum.

FIG. 12 is a plan view of the program drum and is taken along line 12—12 of FIG. 11.

FIG. 13 is a sectional view of the program drum driving ratchet and is taken along line 13—13 of FIG. 12.

FIG. 14 is a sectional elevation of a portion of the drum driving mechanism and is taken along line 14—14 of FIG. 12.

FIG. 15 is a developed view of the three printed facets of the program drum illustrating the inscriptions therein.

FIG. 16 is a plan view of the receipt printer unit as seen from line 16—16 of FIG. 3.

FIG. 17 is a sectional plan view of the customer's token ejector, illustrating the same in its initial position.

FIG. 18 is a view similar to FIG. 17 illustrating the ejector in its inner position.

FIG. 19 is a sectional view of certain parts associated with the void bar.

FIG. 22 is a timing chart.

Figure 1:
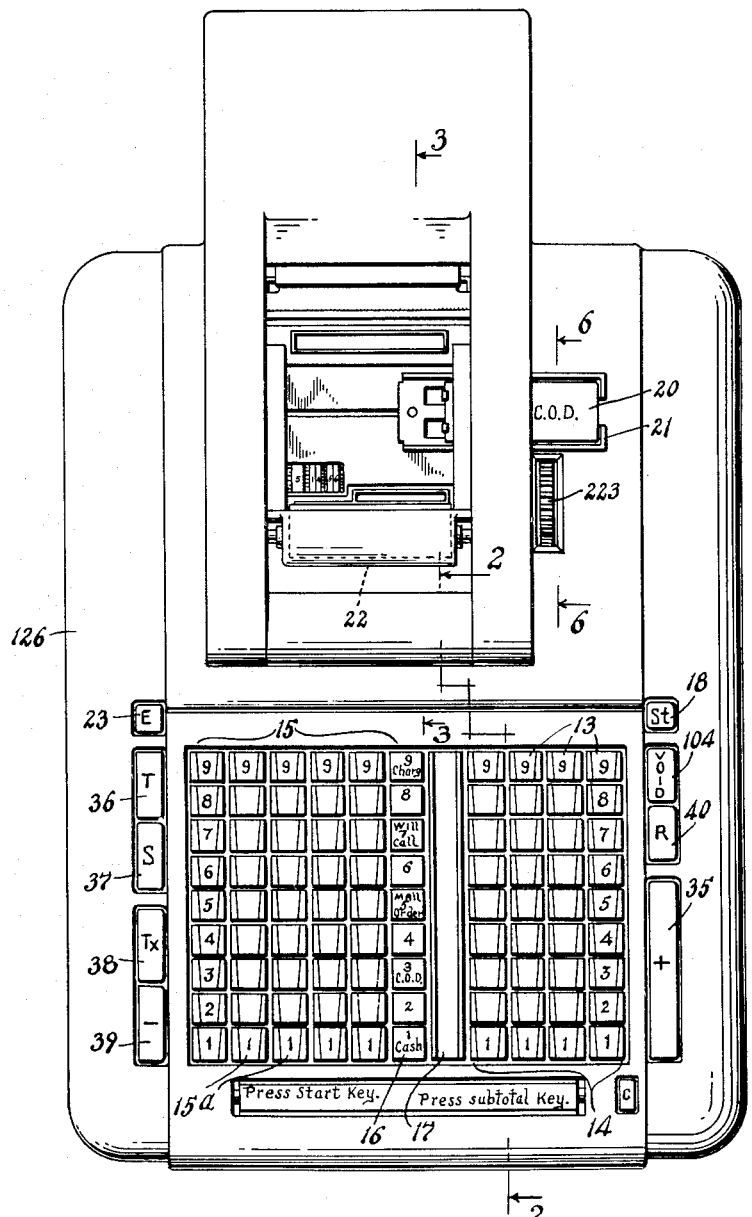

This sales transaction machine embodies certain mechanism which is basically similar to that found in the well known Clary adding machine and reference is hereby made to the R. E. Boyden Patent No. 2,583,810 issued on June 7, 1949, for details of the basic Clary adding machine. Therefore, only those portions of such mechanism which relate to, or form a part of, the present machine will be described in detail herein. This application is a division of Patent Application Serial No. 618,345, filed October 25, 1956, for Sales Transaction Machine and since matured into Patent No. 2,894,449 issued on July 14, 1959.

The machine is of the full keyboard type and comprises four rows of denominationally arranged differential actuator racks 12 (FIG. 2), each controlled by a row of nine amount keys 13 and located at the right hand side of the machine.

A plurality of like racks (not shown) located at the left hand side of the machine are controlled by keys 15a similar to the amount keys but intended only to control entry into an identification printer section. For this purpose, the keyboard is arranged in two sections. The right hand section 14, including the four rows of amount keys 13, is provided to enter the amount of items included in a sales transaction and range progressively in digital value from "1" to "9." The left hand section 15 of the keyboard is provided to enter various identification data pertaining to sales transactions, as indicated on the sample receipt illustrated in FIG. 20. The right hand row 16 of the keyboard section 15 carry numerals ranging from "1" to "9" which may be used as a code representing the type of transaction, i.e. "9" for charge, "3" for C.O.D., "1" for cash, etc., when entered by depressing an add bar 35. When entered by a tax bar 38, these numerals may be a code for Federal, State, etc., tax. When entered by a minus bar 39, these same numerals may be a code for refund, discount, etc.

The left and right hand sections of the keyboard are divided by a fixed strip 17.

Figure 3:
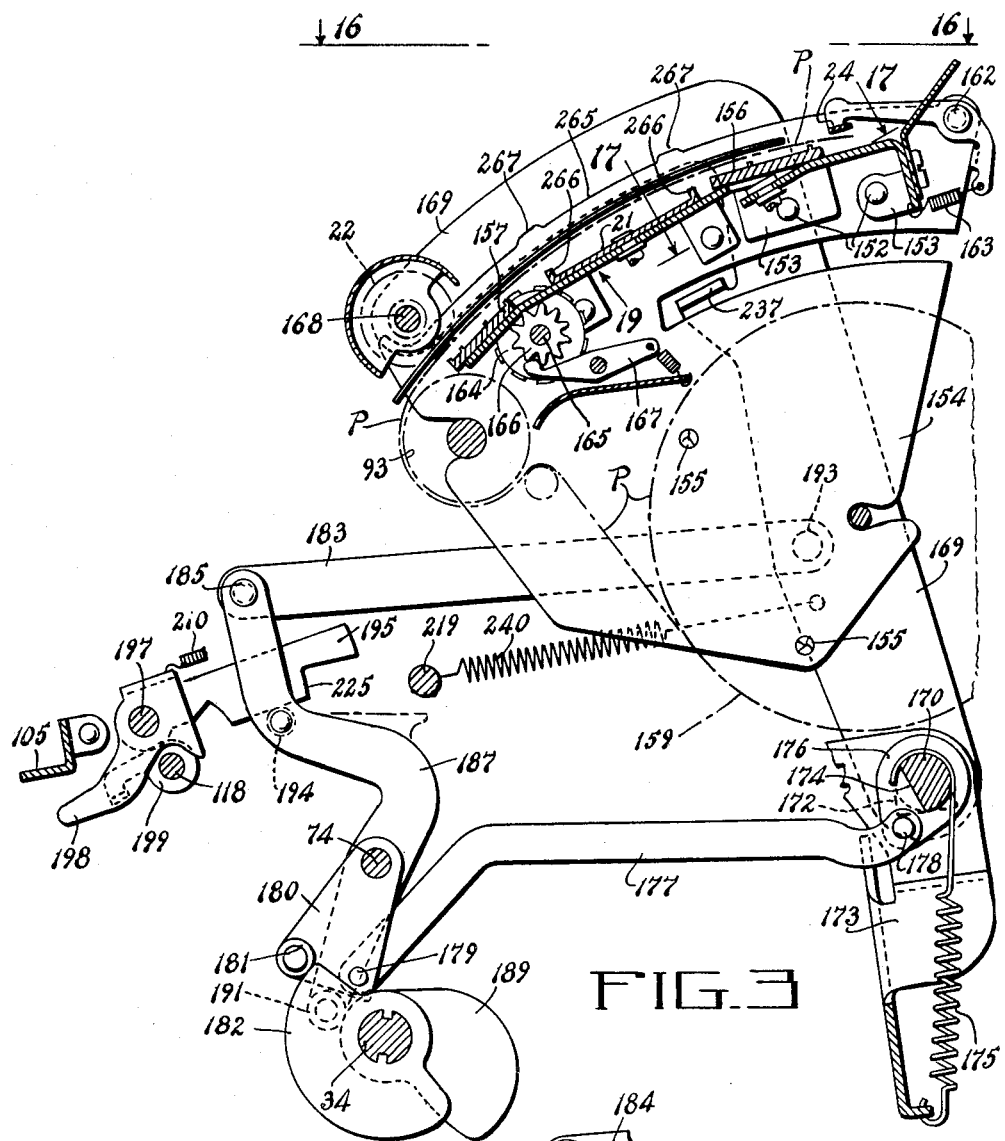
FIG. 3 is a longitudinal sectional view taken generally along the line 3—3 of FIG. 1 illustrating the receipt printer unit together with some of its controls in initial position.

Describing first the general operation of the machine, it is assumed that the machine has been cleared beforehand by depression of an end-of-transaction bar 23 which has also released a normally depressed start key or bar 18 (designated ST in FIG. 1 and described later). All of the control bars of the machine are normally locked to prevent unauthorized persons from operating the same. Therefore, the start bar 18 must be first pressed to unlock the control bars. It is also assumed that the paper receipt tape P (FIG. 20) has already been threaded into a position above a receipt printer table designated generally at 19 (FIG. 3).

If the transaction is to be of the "charge" type, a customer's charge token 20 (FIG. 1) will be placed in a slide 21 and the latter will be manually pushed to the left so as to align the token 20 with a sintered preinked printing roller 22 carried by means to be described hereinafter. The token 20 may be of any suitable well known construction having the customer's name, address, etc., embossed thereon with upstanding characters, thereby identifying the customer by an imprint upon the receipt. Such a token is disclosed, for example, in the patent to Dugdale, No. 1,801,593 issued on April 21, 1931.

The clerk now enters the store department number in any of the first three rows of keys at the left in section 15, the catalog number of the first item purchased in the next two rows in section 15, and then the amount in the section 13. Assuming that the start bar 18 has been depressed to unlock the control bars of the machine, the add key is now depressed thereby entering the amount into the accumulator and causing the roller 22 to roll upwardly from the position of FIG. 4 to that of FIG. 5 thereby impressing the form carried by the table 19 upon the upper surface of the tape P, as illustrated generally at 250 in FIG. 20, and printing the numerical data upon the tape P as indicated by the first horizontally printed line 251 of such data. The paper is now advanced one space and the keyboard is cleared for the next entry. The roller 22 is latched in its upper position illustrated in FIG. 5, clear of the tape P, while the subsequent entries are made and remains in such position until the end-of-transaction bar 23 is depressed.

One or more additional item entries may be made, including item catalog number and amount, and upon depression of the add bar after each item entry, these are printed as indicated at 252 (FIG. 20) and the tape P is again advanced one space by mechanism not shown. Following this, a subtotal is obtained as indicated at 253 to form a basis of computing the tax or taxes. Such tax is then entered in the keyboard and tax bar 38 depressed, the tax being printed as at 254 and 255. The total is then obtained by depressing total bar 36 and the total is printed as at 256.

Additional identification data such as the customer's number, clerk's number, etc., is entered in the left hand keyboard section 15 and the add bar depressed to print the same as indicated at 257. Thereafter, the end-of-transaction bar 23 is depressed causing a cycle to clear the machine preparatory to a new transaction and to lock the control bars against redepression.

During the last described cycle, the form printing roller 22 is moved downwardly to its initial position shown in FIG. 3. However, during this downward passage of the roller it is held out of contact with the tape P so that a print is not made upon the latter. During the last described cycle, the tape P is also advanced approximately the length of the table 19. The tape may now be severed by drawing the same against the tear-off bar.

Figure 20:
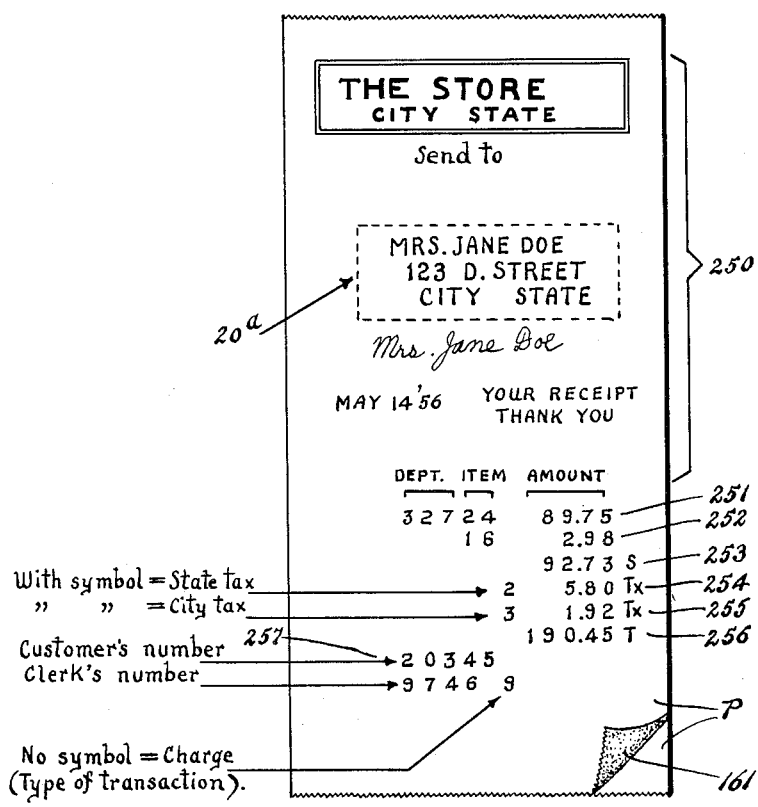
FIG. 20 is a facsimile of a completed receipt.
Figure 21:
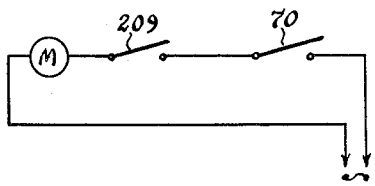
FIG. 21 is a wiring diagram of the motor circuit.

The tape is provided in duplicate (as shown in FIG. 20) by the use of a carbon transfer coating 161 on the back of the original tape so that the original may be given to the customer as a receipt while the carbon copy is filed for bookkeeping purposes.

Figure 5:
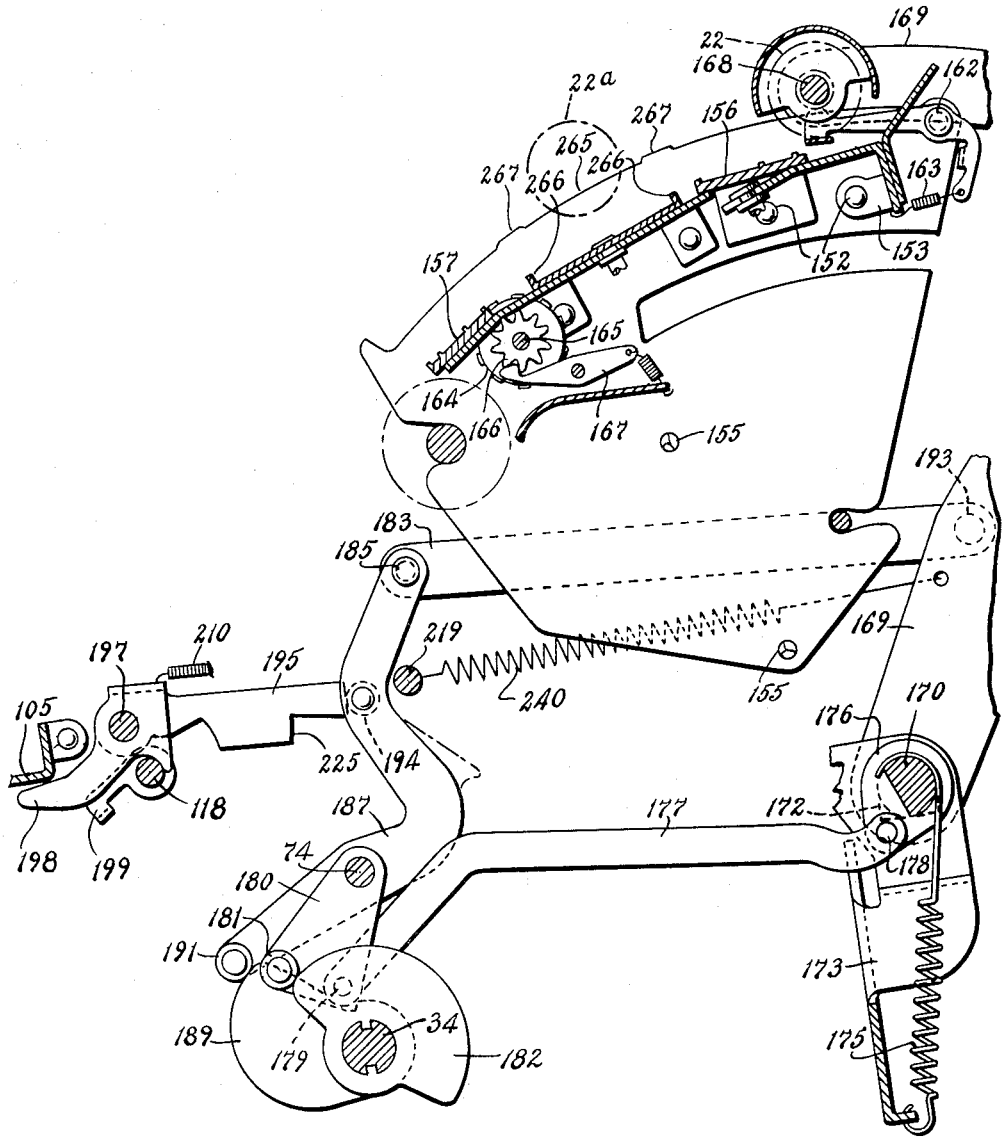
FIG. 5 is a view similar to FIG. 3 with the printer and its controls near the end of its printing stroke.

In the event an erroneous entry has been entered in the machine or the sale uncompleted, a void key 104 is depressed thereby causing a machine cycle and permitting the roller 22 to move from its upper position of FIG. 5 to its "void" print position shown by the dot and dash line position 22a and located approximately midway between its extremes of movement. During this movement the roller is held out of printing contact with the tape. The roller is then rolled upwardly during this cycle while in printing contact to its position shown in FIG. 5, thereby overprinting the upper portion of the form on the formally and previously printed data to indicate that the sales transaction has been voided.

The keyboard comprises a plurality of keys like 13 (FIG. 2), each having a key stem 25 guided for vertical movement in aligned slots formed in plates 26 and 27, the latter plates forming part of keyboard frame supported by the machine frame. The lower edges of the key stems cooperate with spaced shoulders 28 formed on the aligned racks 12 to limit the forward advancement of each rack to a number of increments corresponding to the value of the key depressed in the associated row.

Spring means (not shown) are provided for normally holding the various keys in their illustrated raised positions, and means are further provided for latching any key in rack arresting position upon depression thereof. For this purpose, each key has a cam lobe 29 engageable with a locking bail 30, each row of keys having such a bail. Each bail is pivoted at its opposite ends to front and rear upstanding walls 31 of the bottom plate 27. As a key is depressed, it will rock its associated bail outwardly, and as a lobe 29 passes the bail, the latter will be retracted partially by a suitable spring (not shown) to a position wherein it latches the key in a rack arresting position.

A zero block 32 depends from each lock bail 30 and, when no key in a bank associated with a particular rack is depressed, the bail will locate the zero block in a position directly in front of one of the shoulders 28 of the rack, thereby preventing substantial forward movement of the rack during a subsequent cycle of the machine. However, when any amount key is depressed and latched down, its associated bail 29 will be held outwardly sufficiently to maintain its zero block out of the path of the aligned rack.

The machine is driven by a motor (not shown) through a cyclic clutch 33 (FIG. 10) having its driven side connected to a rotatable shaft 34. The clutch is effective to cause a complete rotation of the shaft 34 during each cycle of operation.

The machine is controlled to perform different operations by depressing various control bars, i.e. add bar 35, total bar 36, subtotal bar 37, tax bar 38, subtract bar 39, a repeat key 40, void key 104, the start key 18 and the end-of-transaction bar 23. The add bar 35 is suitably connected, by means not shown herein but disclosed in the aforementioned Boyden patent, to a rock shaft 41 (FIG. 10) having an arm 42 clamped thereon and engageable with a pin 43 fixed on a clutch control bar 44. The add bar 35 is thereby effective through rocking of the shaft 41 to advance the clutch control bar 44 to the left to effect engagement of the clutch 33.

The clutch control bar 44 is connected through a hook 45 to a latch 46 through a pin 47. The latch 46 is part of a spring powered release device for causing engagement of the clutch 33. The latch 46 is pivoted upon a frame pin 48 and engages a roller 49 carried on a slide 50 supported for endwise movement by the frame pin 48 and another frame pin 51. When the latch is partially rotated clockwise it will disengage the roller 49 thereby permitting the slide 50 to be driven to the left by a spring 52. As the slide 50 moves to the left, a lug 53 thereon strikes a pin 54 carried by a clutch control dog 55 thereby rocking the latter counterclockwise about a pivot support 260 to enable engagement of the clutch 33.

When the slide 50 is driven to the left, a notch 56 formed in the slide moves adjacent a pin 57 carried on a cam follower 58. The latter is pivotally supported on the shaft 74 and is urged counterclockwise against a cam 59 by a spring (not shown). Part way in the machine cycle, the cam 59 becomes effective to move the slide 50, through the follower 58, back to its latched position thereby permitting the dog 55 to be returned clockwise by the spring 69 to its normal clutch disengaging position shown in FIG. 10. The latch 46 is returned by a spring 60 and the clutch control bar 44 by a spring 61.

Pins 62, 63, 64 and 65 (FIGS. 9 and 10) underlying the stems of the control bars 36, 37, 38 and 39, respectively, are fixed to individual cranks all pivoted upon frame pins, like pin 264, (FIGS. 9 and 10) and urged into their upper illustrated positions by individual springs, like spring 265. It will be observed that when the clutch control bar 44 is moved to the left by depression of one of the aforesaid pins by a control bar, ledges 66 thereon will prevent the depression of any other control bar. Likewise, when the bar 44 is moved to the left a shoulder 67 of the latch 46 will be blocked beneath the roller 49 thereby preventing the return of the bar 44 to the right except as hereinafter described.

The clutch dog 55 is also effective, when rocked counter-clockwise to engage the clutch, to rock a switch control lever 68 against the action of a spring 69 thereby closing a switch 70 in the machine motor circuit.

Means (not shown) are provided for advancing the racks 12 toward the left during the first part of a machine cycle and for returning them to their illustrated home positions during the latter part of the cycle. The racks are provided with slots 71 and 72 which are slideably guided over rack support shafts 73 and 74, respectively. The shaft 73 is slideably mounted in guide slots 75 (FIGS. 9 and 11) formed in the machine side frames 76, while the ends of the shaft 74 are fixed in the side frames.

In order to yieldably advance the various racks, each rack has opposed notches 77 located at the closed end of its slot 71, the notches being normally engaged by rollers 78 carried by pawls 79 pivotally mounted on the shaft 73. A spring 80 urges each pair of pawls in opposite directions thereby holding the rollers 78 in driving engagement with the notches 77. However, during advancement of the shaft 73, when any of the racks 12 are blocked by a zero block 32 or a depressed key stem 25, the rollers 78 will ride out of the notches 77 of the blocked rack and along the edges of its slot 71.

Figure 2:
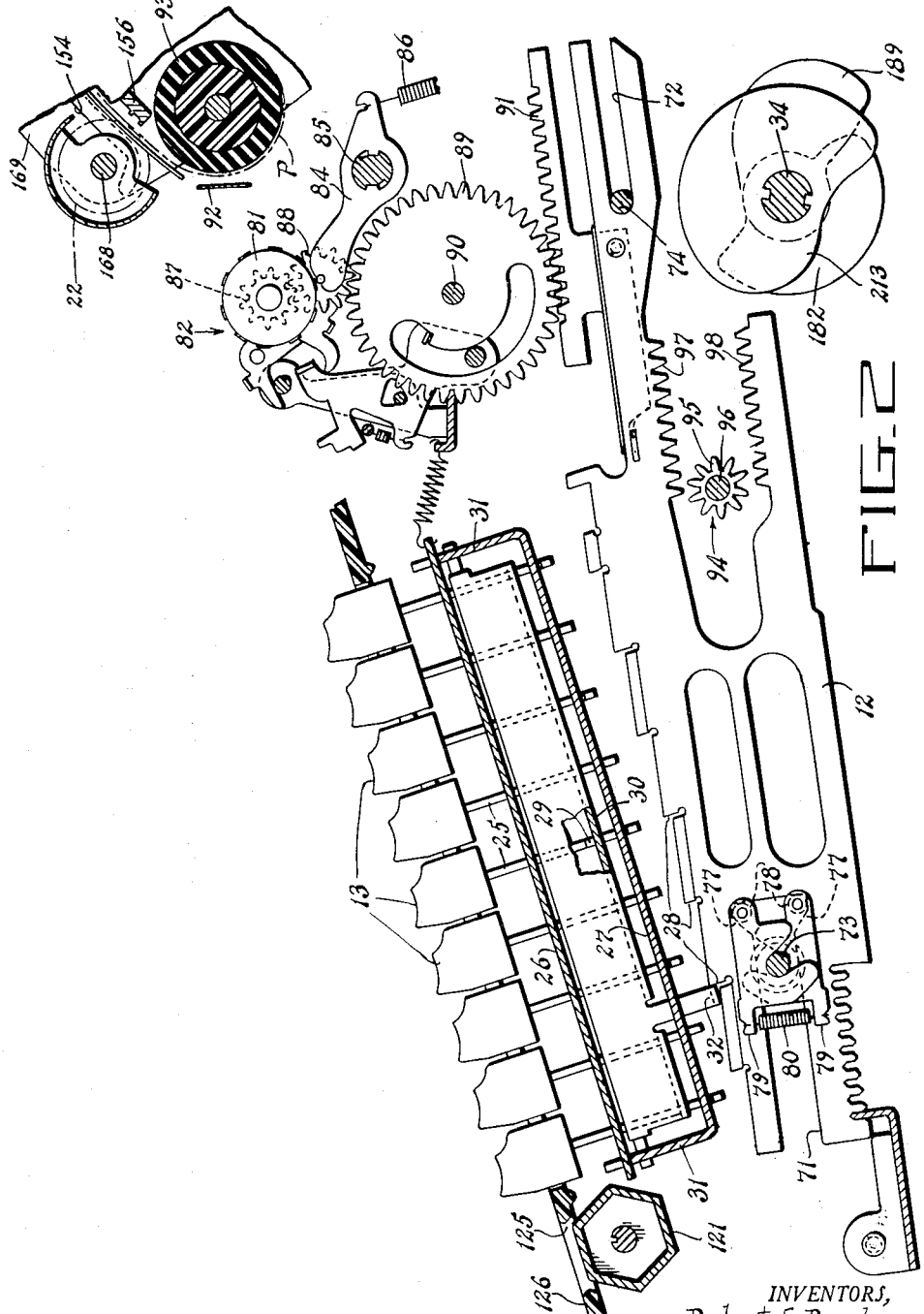
FIG. 2 is a longitudinal sectional view through the keyboard printer and associated parts of the machine and is taken along the line 2—2 of FIG. 1.

The racks 12 are each operatively entrained with a respective one of a series of numeral printing wheels 81 of a data printer generally indicated at 82 in FIG. 2. Each printer wheel except a special symbol printer wheel has a series of type characters spaced therearound and advancing in value from "0" to "9."

The special symbol printer wheel (not shown) entrained with a symbol rack 83 (FIG. 9) is provided with a series of type therearound corresponding to the respective control bars and indicative of the type of operation performed by the machine.

Each printer wheel is rotatably mounted on an individual arm 84 loosely keyed on a printer control shaft 85 and spring urged clockwise by a tension spring 86. A gear 87, integral with each printer wheel, is maintained in continuous mesh with a gear 88 also carried by the respective arm 84.

Except during printing operations, the arms 84 are held in their respective illustrated positions by the shaft 85 wherein the gears 88 mesh with associated idler gears 89 rotatably journaled on a fixed shaft 90. The latter idler gears mesh continuously with offset rack sections 91 integrally mounted on the various racks 12.

During a mid-portion of a cycle, and after various racks 12 have been advanced to different positions limited by the key stems 25, the shaft 85 is rocked clockwise, allowing the springs 86 to likewise rock the arms 84, if otherwise allowed to do so, causing the printer wheels 81 to move into printing contact with a printing ribbon 92 and the paper tape P as the latter passes around a platen 93.

An accumulator 94 is provided comprising a series of gears 95 rotatably journaled on a shaft 96 and associated with the racks 12 controlled by the right hand section 14 only of the keyboard. Normally, the gears are located out of mesh with upper and lower rack sections 97 and 98 formed on the various racks, as shown in FIG. 2. During additive entry operations of the machine, the accumulator is raised to mesh the gears 95 with the rack sections 97 prior to the forward advancement of the racks and is returned to its illustrated neutral position to demesh the gears at the mid-portion of the cycle after the racks have been fully advanced and before they are returned. During subtractive entries and totaling operations, the gears 95 are lowered into mesh with the sections 98 prior to advancement of the racks and are thereafter returned to neutral before the return of the racks from advanced positions.

The symbol rack 83 (FIG. 9) is supported in a manner somewhat similar to that of the aforementioned racks 12, being guided over shaft 74 and a frame pin 275 and is yieldably connected to the drive shaft 73. For this purpose, a detent pawl 99 is pivoted to the rack at 100 and is urged upwardly by a spring 101 to normally maintain a detent notch therein in embracement with the drive shaft 73. Thus, the symbol rack is advanced by the shaft 73 until one of its stop shoulders, like 102, engages a pin, like 65, which has been depressed by a control bar stem to a lowered position, like 65a. At this time, the detent pawl 99 will yield, thereby positioning the rack to set the aforementioned symbol printer wheel (similar to wheel 81) in position to print a symbol indicative of the type of operation performed by the machine. Thus, lowering of the pins 62, 63, 64 and 65 performs two functions, first, the advancement of the clutch control bar 44 and, second, the differential blocking of the symbol racks.

However, the pin 62 associated with the total bar 36 is not effective upon depression of the total bar to stop the symbol rack at "total" position although the pin itself is lowered to move the clutch control bar 44. The stoppage of the symbol rack at "total" position when the total bar 36 is depressed is effected by a toe 103 formed on the stem of the total bar which, when the total key is depressed, is lowered into the broken line position 103a wherein it can block an aligned shoulder on the symbol rack.

However, the pin 62 is effective to stop the symbol rack at a more advanced position beyond the "total" position whenever either the "end-of-tranaction" bar 23 or the void key 104 is depressed. For this purpose, a bail 105 (FIGS. 9 and 19) is pivoted at each end of the side frames 76 of the machine. Integral with the bail 105 at the left side of the machine is a hook shaped camming lever 106 overlying the pin 62. Also, integral with the bail 105 at the right side of the machine is a toe 107 (FIG. 19) which underlies a pin 108 carried by a crank arm 109 pivoted on a frame pin 110. The stem of the void key 104 overlies the pin 108 so that when the void key is depressed (as seen in FIG. 19) the bail will transfer movement to the pin 62 thereby lowering it to its lowered position 62a. Accordingly, the symbol rack will be arrested at the most advanced or "end-of-transaction" position. The latter position of the symbol rack is also obtained when an extension 111 (FIG. 10) on the stem of the bar 23 depresses the pin 62 to its lowermost position. In either case the stem of the total bar 36 is prevented from falling by a detent spring 112 fixed to the keyboard top plate 26 and frictionally engaging a notch in the edge of the stem.

Describing now the construction of a program indicating mechanism generally indicated at 113 (FIGS. 11 to 15, inclusive), the latter comprises a drum 121 on which are printed instructions for the machine operator to follow. Located at the right hand side of the machine is a rack 114, driven by shaft 73 in the same manner as the amount racks 12, and entrained through intermeshed gears 115 and 116, shafts 117 and 18, and intermeshed gears 119 and 120 (FIG. 9) with the symbol rack 83 located on the left hand side of the machine. The purpose of the gear train is to arrest the rack 114 with the symbol rack 83 when the latter is stopped by the control bars.

The drum 121 is hexagonal in cross section and is keyed to a shaft 122 journaled at its ends in brackets 123 and 124 riveted to the machine side frames and located at the forward end of the machine so as to be read through an opening 125 (FIG. 2) provided in the top of the machine case 126. The drum 121 carries instructions on alternate ones of the sides thereof as indicated at a, b, and c (FIGS. 11, 13 and 15). Also keyed on the shaft 122 is a three toothed ratchet wheel 127 and a disc 128 having three indentations 129 whereby the disc may be prevented from accidental turning by a detent 130 pivoted at 131 upon a side frame and urged against the edge of the disc by a spring 208. Freely journaled upon the shaft 122 is a Geneva like gear 132 having a body extension 133 at one side thereof upon which is pivoted at 134 a pawl 135 urged by a spring 136 into engagement with the ratchet 127. A curved segmental rack 137 having two mutilated gear sections 138 and 139 located in side by side relation is pivoted on a frame pin 140, and has a driven connection through a link 141 to the rack 114. The gear 132 is also integrally formed with two sets of gear teeth, one set having two teeth, 142 and 143, and the other set having four teeth, 144, 145, 146 and 147. The tooth 145 is located behind and formed integral with the tooth 143 so as to mesh between the two teeth 148 and 149 of the gear section 138. The gear 132 is retained on the shaft 122 by a clip 132a.

In the cycle initiated by depression of the tubtotal key 37, the racks 83 and 114 move together three increments before being stopped by the lowered pin 63. In a totaling cycle, a four increment movement of the latter racks occurs before being stopped by the toe 103. In an end-of-transaction cycle, a seven increment movement of the racks occurs before the racks are stopped by the pin 62.

The rack 137 and the gear 132 are so formed and timed that three increments of symbol rack movement will move the pawl 135 clockwise from a position overlapping one tooth of the ratchet 127 to a position overlapping the next tooth of the ratchet, i.e. from 150 to 151 of FIG. 13, the gear 132 rotating from the full line position toward the broken line position of FIG. 14. When the symbol rack 83 and the rack 114 return to their positions FIGS. 9 and 11, the rack 137 will return the gear 132 to the full line position of FIG. 14, thereby causing the pawl 135 to pull the drum 121 around one-third of a revolution, i.e. the drum surface b (see also FIG. 15) will move up to the reading position formally occupied by the surface a in FIG. 13. When the stated four and seven increment rack movements occur in response to depression of the bars 36 and 23, respectively, the teeth 143 and 142 slide along the smooth portion of the section 139. Therefore, only one tooth of the ratchet 127 is overlapped by pawl 135 so that the drum 121 is never pulled more than one-third of a revolution.

The symbol rack movement induced by the depression of the bars 39 and 38 are only one and two increments, respectively. Therefore, the pawl 135 does not move a full third of a revolution and the next tooth of the ratchet 127 is not overlapped. Consequently, the pawl slides back to its former position without moving the drum.

Figure 4:
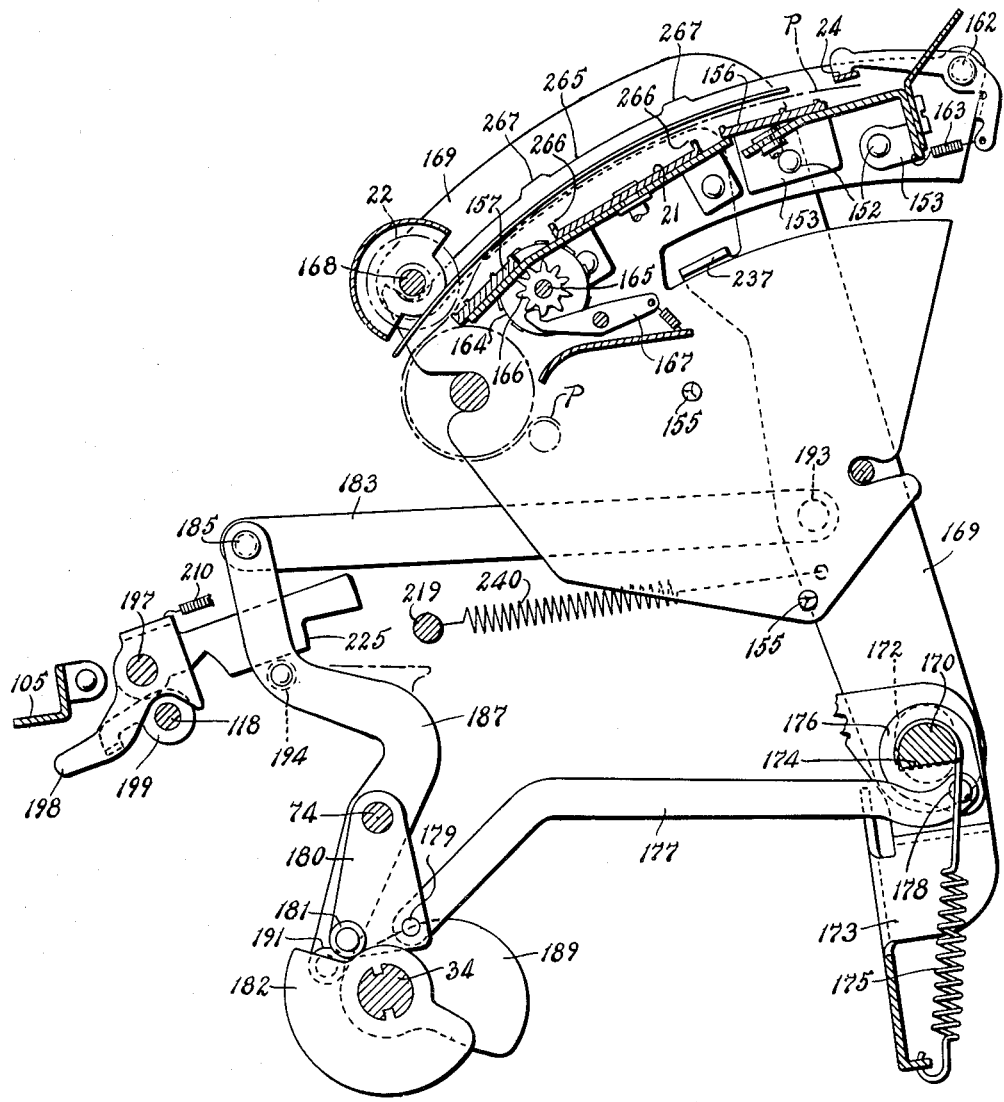
FIG. 4 is a view similar to FIG. 3 illustrating the printer and its controls in a second or advancing position.

As stated hereinbefore, certain indicia is printed on each receipt, above the first line 251 (FIG. 20) of numerical data printing. The construction and movement of the means for printing such indicia is illustrated in FIGS. 3, 4 and 5 and will now be described. The printing table 19 is secured at its edges, as by bend down tabs 152 and rivets 153, to side frame plates 154 secured as by rivets 155 to the side plates 76 (FIG. 9) of the machine. Plates 156 and 157 having type indicia embossed thereon are secured to the table 19 as by screws 158 (FIG. 16).

Loose tokens similar to the token 20 may be provided for insertion in the slide 21 which tokens have embossed thereon type characters indicating the type of transactions, such as "Cash." In the case of a charge type transaction, a customer's token indicating the customer's name, address, etc., may be inserted in the slide to effect an imprint on the receipt as indicated at 20a (FIG. 20).

Duplicate paper tape P is fed from a supply roll 159, around and in frictional engagement with the platen 93 so as to overlie the embossed type indicia carried by the plates 156, 157 and the particular token mounted in the slide 21. The paper tear-off bar 24 is pivotally mounted at 162 to the side plates 154 and is urged by a spring 163 toward an upper position shown in FIG. 3 to permit the tape P to be easily threaded thereunder. A series of settable dater wheels 164 are freely journaled on a shaft 165 fixed in the side plates 154 and are positioned so that their type indicia are located on the same plane as the other type indicia.

The dater wheels are detented in their set positions by gear wheels 166 secured thereto and engaged by spring urged pawls 167.

The impression roller 22, formed of a porous material impregnated with a fluid ink, is provided to transfer a facsimile of the various type indicia upon the tape P. The roller is fixed upon a shaft 168 freely journaled in the toes of a pair of inverted L-shaped arms 169. The other ends of the latter arms are freely journaled on the cylindrically formed ends of a cam shaft 170 which is rotatably journaled near each end in slots 172 formed in brackets carried by a portion of a machine frame plate 173. The slots 172 are flat at their bottom edges and the shaft 170 is flatened in cross section at one side, near each end, as indicated at 174. The shaft 170 is continuously pulled downwardly by a spring 175. Observe that when the arcuate portion of the shaft 170 rests on the bottom flat surface of the slots 172 the arms 169 and the roller 22 is pushed upwardly a slight amount so that the roller does not force the tape P against the indicia plate 157 (FIG. 3).

In FIG. 4, the shaft 170 has been partially rotated until the flat surface 174 of the shaft lies slightly above the bottom flat edges of the slots 172 thereby permitting the arms 169 and likewise the roller 22 to be pulled downwardly by the spring 175, thus normally pressing the tape P against the type characters on indicia plate 157.

Means for rocking the shaft 170 and thereby lowering or raising the roller 22 is provided, comprising a crank 176 fixed to the shaft 170, a link 177 pivotally connected at one end at 178 to the crank and at the other end at 179 to a swinging cam follower arm 180 which is pivoted on the shaft 74. The arm 180 carries a roller 181 engageable by a cam 182 keyed to the shaft 34.

Means are provided for moving the roller 22 over the tape P toward the rear of the machine (to the right in FIG. 3), after it has been lowered into intimate engagement with the tape P. For this purpose a pair of links 183 and 184 are respectively connected at one end, as at 185, 186 (see also FIG. 6), to a pair of rocker arms 187 and 188. The latter arms are each pivoted on the shaft 74. A pair of identical cams 189 and 190 (FIGS. 3 and 6) engage, respectively, rollers 191 and 192 carried on the respective arms 187 and 188. The other ends of the links 183 and 184 are each respectively pivoted as at 193 to one of the arms 169. Each of the arms 187 and 188 carries a roller 194 engageable each with one of a pair of latch arms 195 and 196. The latter latches are pivotally supported on a machine cross rod 197 and are each provided with a toe 198 underlying the bail 105. A pair of triggers 199 and 200 are fixed to the aforementioned shaft 118 adjacent the latches 195 and 196, respectively.

The upper edges 265 of the frame plates 154 are formed concentric with the center of the shaft 170 when the later is in its rocked position shown in FIG. 4. The edges 265 are located directly below the outer ends of the roller shaft 168 and are each of such radius that the shaft will ride thereon when the roller 22 passes over areas of the printing plates 156 and 157 having no type characters thereon. The edges will also prevent the roller 22 from impressing the tape P against the surface of the slide 21 when no token 20 is inserted thereon. However, in order to prevent the roller from impressing the tape P against the side lips 266 of the slide 21, raised cam lobes 267 are formed on the edges 220 opposite such lips. Thus, the roller 22 will be raised sufficiently to pass over these lips.

It will be noted that although the table is generally arcuate, the type characters on the plates 156 and 157 and the token 20 are located in flat planes. Thus, as the roller 22 moves thereover, the spring 175 will yield slightly, enabling intimate printing contact over all type characters.

To operate the machine, the token slide 21 must first be pushed toward the left in FIGS. 1, 16, 17 and 18. A pin 201 fixed on the slide cooperates with a slot 202 formed in a toggle arm 203 pivoted to the underside of the printer table 19 at 204 (FIG. 17). The toggle arm 203 is urged into either one of two positions by a spring 205 fixed at one end to the arm by a pin 206 and at the other end by a frame pin 207. The free end of the toggle arm is bent into a lug adaptable to swing into engagement with a switch pin 209 when the slide 21 is pushed in, thereby closing a circuit in the machine motor line whereby the machine may be operated.

The clerk now depresses the start key 18 to unlock the control bars and then enters the amount and identification number of the first item and the department number into the keyboard and presses the add bar 35 thereby engaging the clutch 33 through the bar 44 and also energizing the motor through the switch 70.

The cam 182 will now turn counterclockwise from its position in FIG. 3 to its position in FIG. 4 whereby the roller 181 will be permitted to roll down to the low portion of the cam and the pull of the spring 175 will urge the flat side 174 of the shaft 175 downwardly onto the flat bottom edge of the slot 172 thereby pulling the roller 22 downwardly to press the tape P against the type indicia on plate 157.

Immediately thereafter, the cams 189 and 190, will, through the rollers 191 and 192, cause the rocker arms 187 and 188 to turn clockwise about the shaft 74 thereby moving the roller 22 over the tape P from the position of FIG. 4 to the position of FIG. 5 during approximately 180° of the machine cycle. As the roller reaches its rearmost position, it rides over the tear-off blade 24, causing the later to rock counterclockwise slightly about its pivots 162. Shortly thereafter, the cam 182 will again raise the roller 181 so that the shaft 170 is rocked from its flat to its arcuate surface, raising the roller from printing contact, as illustrated in FIG. 5. When the parts have reached this position, the latches 195, urged by springs 210, move down behind the rollers 194 thereby blocking the return of the roller 22 toward the left during the rest of the cycle.

Also, at the same time that the rocker arm 188 is helping to move the roller 22 toward the right, i.e. during the first half of the cycle, it effects blocking of a paper feed mechanism shown in FIGS. 6 and 7. A triple pronged rocker arm 211 is pivoted on the shaft 74 adjacent the arm 188. One prong carries a roller 212 engaged by a cam 213 keyed upon the shaft 34. Another prong carries a pin 214 located in the path of the rocker arm 188. The third prong is pivoted at 215 to a link 216, in turn pivoted at its other end by a pin 217 to the body 218a of an internal gear segment 218 pivoted upon a frame cross rod 219. The gear 218 is in mesh with a pinion 220 connected to the shaft 221 of the platen 93 by a coiled spring clutch 222 (see also FIG. 8). Also, fixed to the shaft 221 is a hand wheel 223 which extends through an opening formed in the machine cover 126. The gear 218 is urged counterclockwise by a spring 224.

During the cycle initiated by the first entry by the clerk as just above described, the rocker arm 188, having moved clockwise and having been latched in that position, prevents the rocker arm 211 from turning counterclockwise by the engagement with the pin 214 thereby preventing the counterclockwise movement of the gear 218 even though the low place on the cam 213 has moved adjacent the roller 212. This blocking condition continues through all subsequential entries by the clerk because the latches 196 remain behind the rollers 194 until either the void key 104 or the end-of-transaction bar 23 is depressed.

When the void key is depressed as illustrated in FIG. 19, the bail 105 will be rocked thereby and will engage the toes 198, rocking the latches 196 counterclockwise only enough to permit the rollers 194 to fall back until they engage shoulders 225 provided on the latches, thereby also permitting the roller 22 to drop back halfway over the indicia to its dot-dash line position 22a, after which the roller 22 will again be lowered into contact with the tape P and then rolled thereover and to the right in FIG. 3 to overprint and void the unwanted receipt.

When all proper entries have been made, the clerk depresses the end-of-transaction bar 23 which will initiate another machine cycle. During this cycle, the symbol rack will move seven increments as noted hereinbefore, causing the triggers 200 (FIGS. 3 and 7) to rotate counterclockwise sufficiently to pick up the latches, raising them into their dot-dash line positions of FIG. 7.

This will enable springs 240 to actuate arms 169 counterclockwise to return roller 22 to its initial forward position shown in FIG. 3. As the arm 188 recedes from engagement with the pin 214, the spring 224 will now become effective to rock the segment 218 counterclockwise causing the cam follower 211 to follow the cam 213 down to its low point. The coil spring clutch 222 will slip during the last described movement but as the cam follower is subsequently rocked clockwise by the cam 213 the spring clutch 222 will take hold of or grip the platen shaft 221 to turn the platen clockwise and thus advance the printed receipt rearwardly under the tear-off bar so that it may be torn off.

Also, when the end-of-transaction bar 23 is depressed and the symbol rack 83 moves out its fullest extent until it is stopped by the depressed pin 62, a cam plate 226 riveted to the rack, engages a pin 227 (FIG. 10) carried by the hook 45, thereby lifting the hook and disengaging it from the pin 47. The movement of the rack 114 (FIG. 11) coincides with the symbol rack movement and during the end-of-transaction cycle, a pin 228 carried by the rack 114 engages the left hand end of a slot 229 in a bar 230 slideably attached to the rack 114 by a pin 231. When the bar 230 is thus carried fully to the left, a pin 232 fixed on the stem of the start key 18 will snap up behind the bar 230 under the action of a spring 233, thereby locking the bar in its left hand position. In the latter position, the bar 230 in thrust against a lever 234 clamped to the shaft 41 and thereby, through the lever 42, holds the clutch control bar 44 in its left most position wherein the shoulders 66 thereon underlie the various pins 62, 63, 64 and 65 to block all the control bars from being depressed. However, the clutch dog 55 is permitted to fall back to enable disengagement of the clutch and opening of the switch 70 when the machine has completed its cycle because the hook 45 has been uncoupled from the pin 47.

The symbol racks 83 and 114 are also permitted to return to their right hand initial positions because of the slot 229, thereby causing the pawl 135 to turn the program drum 121 one-third of a revolution to its start position wherein the surface $a$ is located uppermost in reading position. The machine will now remain locked until the start key 18 is again depressed which will permit the bar 230 to snap back to the right, overlying the pin 232, when urged by a spring 235. When the start key is depressed, it will also close a switch 236 which may be included in suitable control circuits such as a tape punch or a signal light at the clerk's position. Since the cam plate 226 is removed from engagement with the pin 227 during the latter half of each cycle, and the clutch control bar 44 is permitted to return to its right hand position upon depression of the start key, the hook 45 will again return to a position where it will be coupled to the latch 46.

Returning to further description of FIGS. 17 and 18, one of the printing roller supporting arms 169 is provided with a camming lug 237 which will, as the arm is moved rearwardly, brush aside a by-pass pawl 238 pivoted at 206 on the toggle arm 203. The pawl will thus rock clockwise against the action of a spring 239 and will thereafter snap back into its normal position shown by the broken lines in FIG. 18. When the end-of-transaction bar 23 is depressed, the arm 169 will be advanced as described heretofore causing lug 237 to again engage the pawl and rotate it counterclockwise along with toggle arm 203 so as to move the slide 21 outward to token ejecting position and also disengaging the switch pin 209.

At the end of a transaction, the roller 22 is pulled back to the position of FIG. 3 by a pair of springs 240 connected between the arms 169 and the frame cross rod 219.

Having thus described the invention, what we desire to secure by United States Letters Patent is:

1. In a calculating machine, an accumulator, differential actuators therefor, selection mechanism for differentially controlling said actuators, operating mechanism for said differential actuators including a cyclically operable clutch, depressible control bars, and control mechanism controlled by said bars upon depression of any thereof for causing engagement of said clutch; means controlled by said operating mechanism in response to depression of one of said bars for disabling said control mechanism during an operating cycle, a start key, and means responsive to actuation of said start key for re-enabling said control mechanism.

2. In a calculating machine, an accumulator, differential actuators therefor, selection mechanism for differentially controlling said differential actuators, operating mechanism for said differential actuators including a cyclically operable clutch, a plurality of depressible control bars, and control mechanism controlled by said bars upon depression of any thereof causing engagement of said clutch; means responsive to depression of one of said bars for disabling said control mechanism during an operating cycle, a latching device for latching said control mechanism in disabled condition, a start key, and means responsive to actuation of said start key for releasing said latching device.

3. In a calculating machine, an accumulator, differential actuators therefor, selection mechanism for differentially controlling said actuators, operating mechanism for said actuators including a cyclically operable clutch, depressible control bars, and control mechanism controlled by said bars upon depression of any thereof for causing engagement of said clutch; a symbol printing device differentially controlled by said bars upon depression thereof, means controlled by said symbol printing device in a certain condition only thereof for disabling said control mechanism, a start key, and means responsive to actuation of said start key for re-enabling said control mechanism.

4. In a calculating machine, an accumulator, differential actuators therefor, selection mechanism for differentially controlling said actuators, operating mechanism for said differential actuators including a cyclicly operable clutch; depressible control bars, control mechanism controlled by said bars upon depression of any thereof for causing engagement of said clutch; means controlled by said operating mechanism in response to depression of one of said bars for disabling said control mechanism during an operating cycle, a depressible start key, means for latching said start key depressed, and means responsive to depression of said one of said bars for releasing said start key from said latching means.

5. In a calculating machine, an accumulator, differential actuators therefor, selection mechanism for differentially controlling said actuators, operating mechanism for said actuators including a cyclicly operable clutch; a plurality of depressible controls bars, control mechanism controlled by said bars upon depression of any thereof for causing operation of said clutch, means responsive to depression of one of said bars for operating and then disabling said control mechanism, a latching device normally latching said control mechanism in disabled condition, a depressible start key, means responsive to depression of said start key for releasing said control mechanism from said latching device and for enabling said control mechanism, means for retaining said start key depressed, and means responsive to depression of said one of said bars for releasing said start key from said retaining means.

6. In a calculating machine, an accumulator, differential actuators therefor, selection mechanism for differentially controlling said actuators, operating mechanism for said differential actuators including a cyclicly operable clutch; a plurality of depressible control bars, control mechanism including a coupling controlled by said bars upon depression of any thereof for causing engagement of said clutch; means responsive to depression of one of said bars for causing engagement of said clutch and for thereafter disabling said coupling, a start key, and means responsive to actuation of said start key for enabling said coupling.

7. In a calculating machine, an accumulator, differential actuators therefor, selection mechanism for differentially controlling said actuators, operating mechanism for said actuators including a cyclicly operable clutch; depressible control bars, control mechanism controlled by said bars upon depression of any thereof for causing engagement of said clutch; a symbol recording device differentially controlled by said bars upon depression thereof, means controlled by said symbol device in a certain condition only thereof for disabling said control mechanism, a start key, and means responsive to actuation of said start key for enabling said control mechanism.

8. In a calculating machine, an accumulator, differential actuators therefor, selection mechanism for differentially controlling said actuators, operating mechanism for said actuators including a cyclicly operable clutch; depressible control bars, control mechanism including a disengageable coupling operable by said bars upon depression of any thereof for causing engagement of said clutch; a symbol printing device including a control rack differentially movable to different positions under control of different depressed ones of said bars, respectively; means controlled by said rack when moved to one of said positions for disengaging said coupling, a start key, and means responsive to actuation of said start key for engaging said coupling.

9. In a calculating machine having an accumulator, differential actuators therefor, selection mechanism for differential controlling said actuators, operating mechanism for said actuators including a cyclicly operable clutch; depressible control bars, control mechanism including a disengageable coupling controlled by said bars upon depression of any thereof for causing engagement of said clutch; a symbol printing device including a symbol control rack differentially movable to different positions under control of different depressed ones of said bars, respectively, means responsive to movement of said rack to one of said positions upon depression of a respective one of said bars for disengaging said coupling, a depressible start key, means responsive to depression of said start key for engaging said coupling, means for retaining said start key depressed, and means responsive to depression of said one of said bars for releasing said start key from said retaining means.

References Cited in the file of this patent

UNITED STATES PATENTS

| 2,367,386 | Crosman | Jan. 16, 1945 |
| 2,470,300 | Gang | May 17, 1949 |